US008425295B2

(12) United States Patent
Ballas

(10) Patent No.: US 8,425,295 B2
(45) Date of Patent: Apr. 23, 2013

(54) SYSTEM AND METHOD FOR RATING INTENSITY OF VIDEO GAMES

(76) Inventor: Paul Angelos Ballas, Blue Bell, PA (US)

( * ) Notice: Subject to any disclaimer, the term of this patent is extended or adjusted under 35 U.S.C. 154(b) by 0 days.

(21) Appl. No.: 13/211,824

(22) Filed: Aug. 17, 2011

(65) Prior Publication Data

US 2012/0046113 A1 Feb. 23, 2012

Related U.S. Application Data

(60) Provisional application No. 61/374,599, filed on Aug. 17, 2010.

(51) Int. Cl.
*A63F 13/00* (2006.01)
*G06F 7/60* (2006.01)

(52) U.S. Cl.
USPC .................................................. 463/7; 703/2

(58) Field of Classification Search ............... 463/43, 463/7; 703/2
See application file for complete search history.

(56) References Cited

U.S. PATENT DOCUMENTS

2007/0239479 A1* 10/2007 Arrasvuori et al. ............... 705/2
2008/0222670 A1 9/2008 Lee et al.

OTHER PUBLICATIONS http://exergamenetwork.blogspot.com/p/exergame-experience-rating-system.html "Exergame Ratings", webpage printout date: Jun. 7, 2011; original web posting date and product availability date: unknown; 4 pages.
http://www.esrb.org/ratings/ratings_guide.jsp#rating_symbols "Game Ratings & Descriptor Guide", webpage printout date: Jun. 7, 2011; original web posting date and product availability date: unknown; 3 pages.
http://scholarworks.boisestate.edu/cgi/viewcontent.cgi?article=1102&context=td&sei-redir=1#search="video+game+"exercise+difficulty"" "Determining Intensity Levels for Selected Wii Fit Activities in College Aged Individuals", by Joshua D. Grieser, Boise State University; webpage printout date: Jun. 7, 2011; original web posting date and product availability date: May 2010; 124 pages.
http://en.wikipedia.org/wiki/Video_game_content_rating_system "Video Game Content Rating System", webpage printout date: Jun. 7, 2011; original web posting date and product availability date: unknown; 9 pages.
http://www.wiifit.com "Fitness Game for Nintendo Wii—Wii Fit Plus", webpage printout date: Jun. 7, 2011; original web posting date and product availability date: unknown; 2 pages.

(Continued)

*Primary Examiner* — Arthur O. Hall
*Assistant Examiner* — Jeffrey Wong
(74) *Attorney, Agent, or Firm* — Panitch Schwarze Belisario & Nadel LLP

(57) ABSTRACT

A method of rating the intensity of game play of a video game based on energy expenditure of a user playing the video game including the steps of selecting the video game, determining whether the video game requires the user to expend energy in excess of resting energy rate, testing the video game by having a plurality of users play the video game, measuring energy expenditure of the plurality of users, calculating energy expenditure of each of the plurality of users, calculating an average energy expenditure of the plurality of users and categorizing the video game based on the average energy expenditure as low intensity, moderate intensity or high intensity.

19 Claims, 4 Drawing Sheets

OTHER PUBLICATIONS http://www.wired.co.uk/news/archive/2010-08/18/videogames-exercise-ratings "Why Videogames Need Exercise Ratings", webpage printout date: Jun. 7, 2011; original web posting date and product availability date: Aug. 18, 2010; 6 pages.

http://www.scribd.com/doc/56702651/Energy-Expended-by-Boys-Playing-Active-Video-Games "Energy Expended by Boys Playing Active Video Games", Journal of Science and Medicine in Sport 14 (2011) pp. 130-134, by Kate White, et al.; Centre for Physical Activity and Nutrition Research, AUT University, Auckland, New Zealand; webpage printout date: Jun. 7, 2011; original web posting date and product availability date: unknown; 5 pages.

http://www.medpedia.com/news_analysis/171-Brain-Posts/entries/29026-Getting-Fit-with-Wii--Ranking-Exercise-MET-Values "Getting Fit with Wii-Ranking Exercise MET Values", by Brian Posts; webpage printout date: Jun. 7, 2011; original web posting date and product availability date: May 19, 2010; 3 pages.

* cited by examiner

SYSTEM AND METHOD FOR RATING INTENSITY OF VIDEO GAMES

CROSS-REFERENCE TO RELATED APPLICATIONS

This application is entitled to priority pursuant to 35 U.S.C. §119 (e) to U.S. Provisional Patent Application No. 61/374,599, filed Aug. 17, 2010, which is incorporated by reference herein in its entirety.

BACKGROUND OF THE INVENTION

Video games have been played for many years and are typically sedentary in that a user or gamer plays the game while seated. A user of traditional video games is typically limited in their physical activity while playing the game to pressing buttons or moving a joy stick to control game play. Game play can consist of spending hours sitting in front of a screen pushing the same three buttons over and over again. Traditional games occasionally require control of a character or symbol on the screen using the controller and potentially puzzle solving.

Video game play has evolved from these traditional games to require players to at least stand and make physical movements to control the symbol of the game. Some of these more updated and active video games are not necessarily a rigorous workout, but are significantly more active than traditional video games. Video game designers and manufacturers have recently introduced motion controls and/or exercise-based games into their gaming machines. Numerous manufacturers are producing such active video games based upon customer demand and/or to keep up with their competitors. It would be desirable to develop a system and/or method for rating these more active game systems to provide relatively easily understandable information to consumers regarding the energy or physical activity that is expended during game play.

Manufacturers and designers are also updating popular or existing games that users are familiar with to require more physical activity. That is, popular and familiar traditional games that previously required little to no physical activity are being adapted into active games that provide a very different experience for the user. An individual manufacturer or game developer is not generally driving the updates in the games, but these updates are relatively widespread throughout the manufacturing, developer and gaming industries. These updated, more active games generally urge players to get up off the couch and break a sweat or at least become involved in more intense physical activity than resulted from traditional games. New hardware is paving the way for much of the increased physical activity in game play. Game consoles have developed or incorporated a variety of controllers, such as a wand that mimics a user's movements when the wand is moved and tracked by the game console, which permits players to use precision arm and body motions to interact with the games. Certain manufacturers also utilize camera-based consoles that turn a garners entire body into a controller. In addition, other manufacturers and consoles have developed technology and sensors to track biometrics of a user including breathing and heart rate and have incorporated this information into game play.

The relatively recently introduced motion control and biometric-tracking technology has changed the way gamers interact and play video games in a fundamental way. Nearly all major gaming consoles are moving toward motion control devices. Benefits of this movement in the industry has the potential to combat childhood obesity and/or obesity generally in the general public in a way that was not deemed previously possible. These more active video games have the potential to get sedentary garners off of the couch to participate in active games, some of which are adapted from the traditional/familiar video games that the garners enjoy.

The shift in the industry is typically designed to give consumers new forms of entertainment. However, the industry may channel its immense resources into developing fun games that give players a cardiovascular workout instead of churning out the type of couch-bound, pixel-hunting games companies have often been forced to defend. Such a shift could strike a blow against childhood obesity and/or obesity in general, which has become a major public health crisis in the United States and abroad.

Decades of research in obesity in young people has revealed that people exercise on a more regular basis if they do something they enjoy. Historically, exercise video games have been more like exercise videos in that they attempt to be fun, but mostly wind-up being a boring, monotonous workout to be endured rather than an enjoyable activity people, garners or users look forward to performing.

Some efforts have been undertaken to assess the energy expenditure of these more active video games. These assessments have typically focused on an individual game in order to assess whether the intensity of this individual game is sufficient to replace certain exercise activities recommended by various organizations for optimal health. The results of such assessments are typically presented as raw data of energy expenditure and not as an easily understood ranking, label or meaningful symbol to a non-clinician or consumer. In addition, prior research efforts have typically focused on a single game or a single gaming system. These prior research efforts typically do not take into consideration that the game may vary greatly in exercise intensity depending on which system the game is played on. Further, no systematic protocol has been established to rank games from low to high intensity, taking into consideration the various forms of motion and various consumer console products that are available. These assessments also generally do not take into consideration games played in particular settings that can dramatically impact energy expenditure over a set increment or incremental time of game play. Many assessments or ratings have focused on the violent or non-violent content of games, not energy expenditure.

It would be desirable to develop a system and method for assessing energy expenditure of video games during typical game play. It would be desirable for these assessments to result in a rating system that is relatively quickly and easily understood by a typical consumer and permits the typical consumer to make informed decisions when purchasing these more active games and/or game consoles. It would also be desirable to develop a relatively easily understood system that is able to provide information to parents when making purchasing decisions related to the activity required for video games marketed and/or designed for children. Preferably, such a relatively easy to understand rating system could assist in combating childhood obesity in today's youth and in the general population.

BRIEF SUMMARY OF THE INVENTION

In a preferred embodiment, the present application is directed to a method of rating the intensity of game play of a video game based on energy expenditure of a user playing the video game. The method includes the steps of selecting the video game to rate, determining whether the video game requires the user to expend energy in excess of an approximate resting energy rate, testing the video game by having a plurality of users play the video game for at least one hour intervals, measuring energy expenditure of the plurality of users with physiological sensors, calculating the energy expenditure of each of the plurality of users during a predetermined time period of game play, calculating an average energy expenditure of the plurality of users and categorizing the video game based on the average energy expenditure. The calculated energy expenditure can then be utilized to categorize the video game, preferably utilizing low intensity, moderate intensity and high intensity categories.

In another aspect, the preferred embodiment of the present invention is directed to a system and method for rating video games based on the amount of energy typically required to play the game over a predetermined time period of game play, preferably one hour. Games submitted, presented or selected are preferably screened for further testing and, if eligible, are field tested for multiple hours by one or several testers while physiological data is recorded. Once testing is completed, the various data is analyzed and the game is ranked based upon a preferred ranking system. The ranking system preferably includes at least three categories and may include additional categories that are preferably simple for a consumer to grasp or understand. The game is preferably labeled with the resulting ranking or rating category, which provides a meaningful rating of exercise intensity for a consumer.

BRIEF DESCRIPTION OF THE DRAWINGS

The foregoing summary, as well as the following detailed description of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF THE INVENTION

Figure 1:
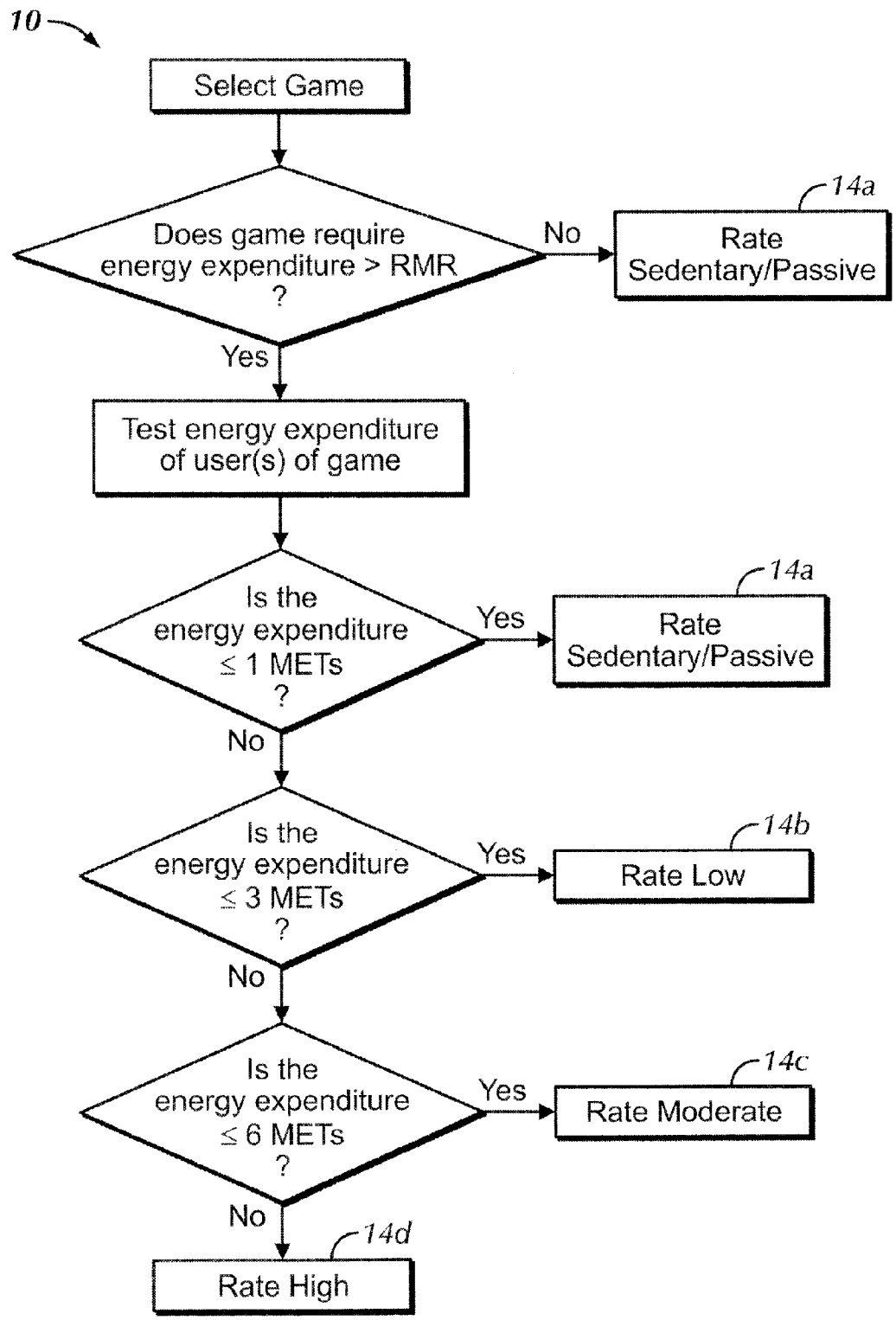
FIG. 1 is a block diagram of a system and method for rating the intensity of video games in accordance with a preferred embodiment of the present invention.

Certain terminology is used in the following description for convenience only and is not limiting. The words "right," "left," "lower," and "upper" designate directions in the drawings to which reference is made. The words "inwardly" or "distally" and "outwardly" or "proximally" refer to directions toward and away from, respectively, the geometric center or orientation of the system and related parts thereof. The terminology includes the above-listed words, derivatives thereof and words of similar import.

Referring to FIGS. 1-4, in the preferred embodiment, the present application is directed to a system and method for rating the intensity of video games 12. The preferred intensity rating system 10 involves selecting the game 12 for rating, testing the game 12 and providing a relatively easy to understand, preferably easy for a consumer to understand, rating for the game 12 based upon the conducted testing or evaluation.

The preferred intensity rating system 10 of the present application results in an intensity rating 14, 15 that may be associated with the evaluated game 12. The intensity rating 12 is preferably a four-tiered or four-category intensity rating 14 including a sedentary/passive rating 14a, a low intensity rating 14b, a moderate intensity rating 14c and a high intensity rating 14d. These intensity ratings 14 are preferably selected due to their ability to simply and easily convey the intensity or activity generally required to play the game 12. The intensity rating 14 is not limited to the preferred four-tiered or four category intensity rating 14 and may include more or less tiers or categories, depending upon preferences and/or particular games 12 or categories of games 12.

In a preferred embodiment, games 12 that are rated in the sedentary/passive rating 14a are typically played by pushing buttons or manipulating a controller while seated. These games 12 typically result in limited or no increase in heart rate, limited or no increase in metabolic rate and are similar in activity level to sitting, reading or watching television. The games 12 that fall into the sedentary/passive rating 14a are typical of traditional video games 12 that have been played for numerous years by garners. The sedentary/passive rating 14a is typically provided to games 12 that result in an energy expenditure of approximately one metabolic equivalent task (1 MET) or approximately the energy expended by a user at their resting metabolic rate ("RMR"). METs is an expression of energy expended during physical activities as multiples of a typical RMR.

The low intensity rating 14b is usually or typically the result of a game 12 where energy expenditure is two to three (2-3) times the user's RMR. The low intensity rating 14b is preferably equivalent to the energy expended by the user while walking. This low intensity rating 14b is preferably given to games 12 that result in the user expending approximately two to three (2-3) METs. Expending two to three (2-3) METs is often associated with activities such as walking at a rate of approximately two miles per hour (2 MPH).

A third category of the preferred intensity rating 14 is the moderate intensity rating 14c. The moderate intensity rating is typically provided to games 12 that result in an energy expenditure of three to six (3-6) times the user's RMR or three to six (3-6) METs. The moderate intensity rating 14c is generally equivalent to a user taking a brisk walk at a rate of approximately three and one-half to four miles per hour (3.5-4 MPH) or leisurely riding a bicycle. The fourth rating of the preferred intensity rating 14 of the present application is the high intensity rating 14d that is typically provided to games 12 that result in an energy expenditure of six to eight (6-8) or more times the user's RMR. The high intensity rating 14d is preferably equivalent to a user jogging, swimming, jumping rope or performing a relatively high intensity workout.

The intensity rating 14 is not limited to the above-described four-level or four-category intensity rating 14 and may have various additional or fewer levels, preferably characterized in a manner that is understandable by a consumer. In addition, the above-described average energy expenditures, expressed, for example as METs, for determining the intensity rating 14 are not limiting and various categories and strategies for placing different games 12 into the categories may be designed and developed by an evaluator 16 or governing body of the intensity rating system 10.

In combination with the preferred intensity rating system 10 of the present application, the very real artistry of video games 12 may become important for public health. As video game developers, game manufactures and gaming system manufactures strive to come up with enjoyable games 12, garners/users 18 and preferably child garners/users 18 may see a decrease in obesity because of hours spent playing enjoyable video games 12 that require a certain level of physical activity from the garners/users 18. This additional time spent playing more active video games 12 results in significant calorie burn. Innovative controllers, interfaces and consoles coupled with competitive pressure to develop fun, active video games 12 could revolutionize the fight against obesity and, particularly, childhood obesity.

The preferred intensity rating system 10 of the present invention may help foster a new era in gaming that provides relatively simple to determine and understand intensity ratings 14. The preferred intensity ratings 14 preferably provide a general idea of calorie burn, for example, average calories burned per hour. The intensity ratings 14 provide an indication to the consumer of calories burned when playing the game 12, which can assist the consumer in making informed buying decisions. This intensity rating 14 would provide a relatively simple method for consumers to understand which games 12 include content appropriate for their children users 18 and provide information about whether the games 12 may be beneficial for their children users 18. The preferred intensity ratings 14 may be utilized in conjunction with existing rating systems, for example, violent or non-violent rating systems, when a consumer is making a decision regarding which game to purchase.

The intensity ratings 14 are preferably incorporated into information provided to consumes when purchasing the games 12. The intensity ratings 14 preferably provide estimates of calories burned by the average person or user 18 in a predetermined time, potentially an hour. For example, the game 12 rated with the sedentary/passive rating 14 indicates to the consumer that the game 12 typically does not result in significant energy or calorie burn during play, at least little more than RMR or one MET. These games 12 that are rated with the sedentary/passing ratting 14 are typically lean-back, button-intensive shooting games or the like. In contrast, active games 12 with a calorie-expenditure rate comparable to walking, brisk walking, running/swimming, jumping rope and/or playing basketball would be provided with the appropriate low intensity, moderate intensity or high intensity rating 14b, 14c, 14d to provide relatively quick, simple to understand purchasing information to the consumer. An independent organization could estimate the minimum calories required to play a particular video game 12 over a predetermined period of time and that rating could be placed onto a label for the game 12 or otherwise communicated to the consumer.

The preferred intensity rating system 10 would go a long way toward helping families make informed decisions about game play. The preferred intensity rating system 10 has the potential to become part of a solution when it comes to obesity, in particularly childhood obesity.

The preferred intensity rating system 10 of the present invention provides the preferred intensity rating 14 for rating video games 12 based generally on the energy expended playing the game 12 over a typical hour of game play by selected users 18. The intensity rating 14 is preferably established by measuring and/or calculating energy expenditures of test users 18 using physiological sensors 20. The intensity ratings 14 for the preferred rating system 10 are generally based on the intensity and energy expenditure from the sedentary/passive rating 14a (similar energy expenditure to sitting) to the high intensity rating 14d indicating high activity (similar energy expenditure to jogging or swimming). The preferred intensity rating system 10 offers consumers simple and objective ratings for comparing video games 12 by the physical intensity or average physical intensity of game play.

The intensity rating system 10 may be applied to any number or all video games 12, past and present, including games 12 that are designed for the most technologically advanced gaming consoles, traditional gaming consoles and gaming consoles that are developed in the future. The preferred intensity rating system 10 may also be utilized for games 12 and devices that are not typically considered video games 12 and/or video game consoles. For example, the intensity rating system 10 may be utilized for games that are played on a user's smart phone, personal organizer device or similar devices. A majority of these games 12 would typically fall into the sedentary/passive rating 14a, but efforts are being made to develop games 12 for such devices that would fall into higher categories of the intensity rating 14. For example, augmented reality games 12 that ask the user 18 to cross certain distances in a certain amount of time using a pedometer and/or GPS technology or other varieties of sensors or positioning systems could result in games 12 that have a categorical intensity rating 14 greater than the sedentary/passive rating 14a for games played on smart phones, personal organizers or similar devices. Games 12 could be ranked for nearly any type of device including a home computer, smart phones, gaming console or nearly any device that urges a user to play a game.

Testing of a selected game 12 for incorporation into the intensity rating system 10 typically relies on criteria based on thermodynamics and clinical/human testing, particularly games that have intensity ratings greater than the sedentary/passive rating 14a. Evaluation of the game 12 by the evaluator 16 is preferably the initial screening step for the game 12. The most passive games 12 do not necessarily require testing using the physiological sensors 20 and a plurality of users 18 under controlled conditions and may be categorized in the sedentary/passive rating 14a without such clinical/human testing.

Games 12 that the evaluator 16 expects or determines require clinical/human testing to incorporate into the intensity rating system 10 are typically games that require at least some physical activity from the user 18. These games 12 are preferably categorized in the preferred intensity rating system 14 by determining an average energy expenditure of a typical user 18 in an hour of game play. This average energy expenditure may be determined by a submitted summary of the game 12 by game developers, the manufacturer, users 18 or other like, interested individuals or organizations. Alternatively, this average energy expenditure may be determined by a testing protocol of game play involving independent tester users 18 that is developed by the evaluator 16. The evaluator 16 preferably develops the test to evaluate the energy expenditure for a typical hour of game play, which may be tailored to the specific technology utilized to play the game 12 and the kind of game 12 being played. For example, if the game 12 is primarily a rhythm dance game 12, the average intensity of the game 12 could generally be determined by a single user 18 playing the game for an hour as there is typically little physical intensity variation in certain rhythm dance games 12. In contrast, an adventure game 12 that has a period of relative inactivity with short bursts of intense physical activity would typically require a different testing protocol. The evaluator 16 preferably devises a testing strategy for such variable intensity games 12 where the average physicality or energy expenditure would be assessed over several hours of game play to determine the average expenditure of energy for playing the game 12 during an average hour of game time. Certain adventure games 12 may also requires even longer intervals of inactivity interspersed with spurts of intense activity. Such adventure games 12 may result in the evaluator 16 devising testing protocols that require users 18 to play the game 12 for sixty hours (60 hrs) or more to determine average energy expenditure for a typical one hour (1 hr) period of game play. Numerous periods of testing times for the users 18 may be required to determine the typical energy expenditure for any specific game 12 to enter into the intensity rating system 10 and the above are non-limiting examples.

Recommended exercises or exercise for individuals is generally based on how long a user 18 participates in a particular intensity of exercise over the course of a day or a week. Various organizations provide recommendations for individuals, such as one hundred fifty minutes (150 min.) per week of moderate intensity exercise or seventy-five minutes (75 min.) of high intensity exercise. For the purposes of the preferred rating system 10, the game 12 is preferably provided with an intensity rating 14 based on a per hour duration of typical game play. The per hour energy expenditure is preferably determined by calculation, screening, field testing and/or other appropriate methods or techniques that are developed by the evaluator 16. Such a strategy is preferred for the intensity rating system 10 because video games 12, unlike many other forms of physical exertion such as playing basketball, swimming, jogging, walking or other activities, may not have a consistent rate of exertion through the course of the activity. Certain games 12 may have only fifteen minutes (15 min.) per hour during which significant physical exertion is prompted while other games 12 may have continuous physicality over the entire period of game play. Until screening, field testing and/or other evaluations are conducted by the evaluator 16, it cannot be presumed that the physical exertion observed during a single point in or short interval of time of game play of the game 12 is the same level of physical intensity maintained throughout game play.

The intensity rating system 10 of the preferred embodiment is also able to rate games 12 that have various intensity settings. The intensity rating system 10 may be utilized to test or analyze such games 12 and determine a min/max expenditure for categorization in the intensity rating 14. Therefore, several intensity ratings 14a, 14b, 14c, 14d may be appropriate for games that have these variable intensity settings. The consumer can be informed by the manufacturer, developer or organization communicating the intensity rating 14 to the consumer regarding which rating 14a, 14b, 14c, 14d is appropriate for each setting. The communication may also include information related to the minimum caloric expenditure for the game 12 and what settings result in maximum caloric expenditure for the game 12. Details of how to achieve these settings and results may be communicated in a report of the intensity rating 14 for the specific game 12.

In preferred embodiment of the intensity rating system 10 of the present invention the rankings of the games 12 may be based on objective metrics of energy expenditure that are consistent across many different users 18 of various ages, basal metabolic indices (height/weight ratio), states of cardiovascular health and related parameters. The uniformity of the intensity rating 14 across games 12 preferably allows consumers and users 18 to directly and quickly compare games 12 based on the energy expenditure when playing the game 12, which is preferably analogous to the intensity rating 14. The preferred intensity rating system 10 provides valuable information to consumers for comparison of active or exercise-based games 12. The intensity rating 14 provides consumers with the ability to directly compare such games for comparing energy expended during game play. In combination with the obesity epidemic and the popularity of video games 12, the preferred intensity rating system 10 provides relevant information to consumers and users 18 to make direct comparison buying decisions of such games 12. It is conceivable that users 18 will make decisions for their children's media diet, specifically the purchase of video games 12, based on the expected expenditure of energy or activity level required for these games 12.

Games 12 may be rated in an initial screening process without the requirement for field or clinical testing, as is described above, based on a submitted description of the game 12. If the game 12 is designed to be played on a computer or console where limited physical activity will be requested from the user 18, the evaluator 16 may rank such a game 12 in the sedentary/passive ranking 14 without the need for field testing. Generally, games 12 that are not immediately ranked as sedentary/passive 14a are field tested for qualification in the intensity rating system 10 of the present invention.

The evaluator 16 may also add categories to the preferred intensity rating 14 or remove categories from the intensity rating 14 based on the field testing of a particular game 12. Specific notations may be included in the intensity rating 14 that provide indications to consumers that are unrelated to the energy expenditure required to play the game. For example, notations may be provided indicating that game 12 is appropriate for or targeted to users 18 with disabilities. Such games 12 may include those that entirely rely on use of a player's arms while playing the game 12. Alternatively, a notation may be provided indicating a particular motion game 12 is appropriate for a visually impaired user 18.

The energy expenditure calculated to facilitate the intensity rating 14 of the preferred embodiment of the intensity rating system 10 is not limited to being defined by METs and may be defined by nearly any measure that provides a meaningful value to the average energy expended during play of a particular game 12. Physiological parameters that may be utilized to determine energy expenditure during testing of particular games 12 may include, but are not limited to, aerobic capacity, heart rate, breathing rate, heart rate reserve, temperature, breathing, movement and related parameters.

In the preferred embodiment of the intensity rating system 10, the evaluator 16 typically tests or determines RMR for the selected testers or users 18 prior to conducting field testing. One (1) MET or the RMR of the particular user 18 is typically considered to be three and a half millimeters of oxygen per kilogram per minute ($3\frac{1}{2}$ ml $O_2$/kg/min) and this standard can be utilized for all testers or users 18 in the field test. The evaluator 16 may alternatively establish a base line MET or RMR for each individual user or tester 18 prior to conducting any tests with the particular users or testers 18. The energy expenditure of the user 18 over a predetermined time is then compared to the standard or measured 1 MET or RMR of the user or tester 18 to determine the energy expenditure during game play. Typically, a skilled evaluator 16 understands various methods and strategies for determining the energy expenditure during game play in a particular testing situation, for example, by utilizing calorimetry or like techniques.

Various physiological sensors 20 may be utilized during field testing for the preferred intensity rating system 10 of the present invention. The physiological sensors 20 may include a thermometer, a heart rate sensor, a carbon dioxide sensor, an oxygen sensor, a heart rate sensor, an aerometer, a breathing rate sensor, a movement sensor, a global positioning system, a respiration sensor, a skin conductance sensor, an electromyogram, an optical sensor, a scale or other like sensors that are able to measure physiological characteristics of testers or users 18 during game play. This list of physiological sensors 20 is not all inclusive and alternative sensors 20 and techniques may be utilized by the evaluator 16.

GPS sensing may be particularly appropriate when evaluating energy expenditure of augmented reality games 12 for smart phones. The GPS technology could record distance, velocity, acceleration and changes in altitude of the user or tester 18 while playing the augmented reality games 12.

In the preferred embodiment of the intensity rating system 10, the testing results in a value of energy expended during typical play of the game 12. The preferred method of energy evaluation is the comparison of RMR and the METs value from game play. This comparison is preferably characterized during an average hour of game play.

To evaluate the selected game 12, the evaluator 16 may elect to utilize specially trained video game testers or users 18 and indirect calorimetry or other devices to measure average energy expenditure in a typical hour of play of the game 12 in METs. The testers or users 18 would preferably vary in age, gender and body mass index ("BMI") and at least two testers 18 would test each game being ranked for at least one hour. Testing sessions are preferably video taped or otherwise audio and visually recorded digitally and testers or users 18 preferably complete questionnaires in which they note prominent physicality descriptors during play of the game 12. The physiologic data, audio, video and tester questionnaires may all be reviewed by the evaluator 16 who makes an informed decision regarding whether the specific game 12 requires additional testing to provide a better evaluation of where the game 12 should be listed in the intensity rating 14. In addition, additional testing may be appropriate when the game 12 falls close to a level between ratings of the intensity rating 14. Additional tests may then be conducted of the game 12 or the testers or users 18 may be directed to play the game 12 for longer periods of time. In addition, results may indicate that sporadic, infrequent, inconsistent or diverse forms of physicality in the game 12 require additional testing or longer test periods.

Figure 2:
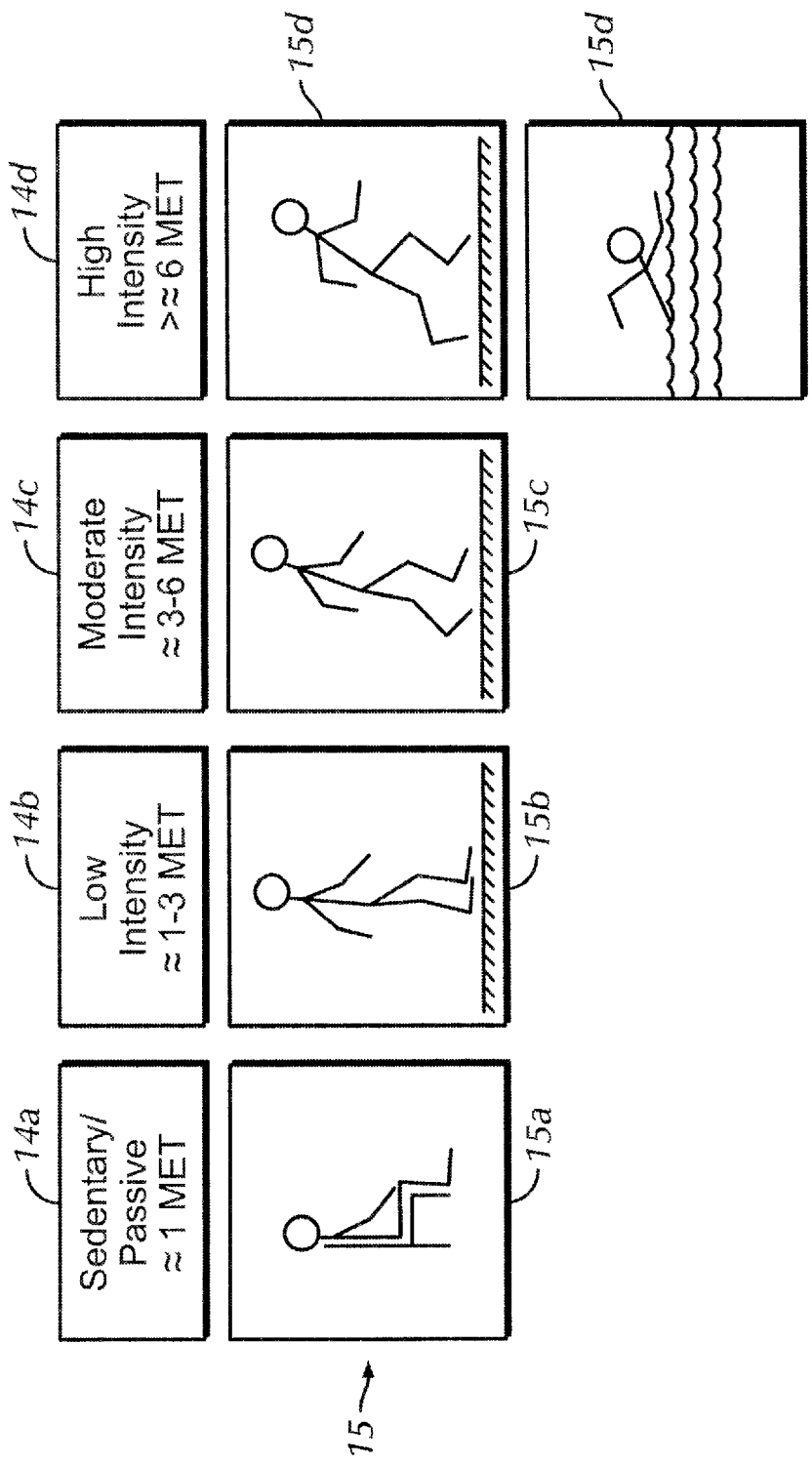
FIG. 2 is a block diagram of rating categories in accordance with the preferred embodiment of the present invention.
Figure 3:
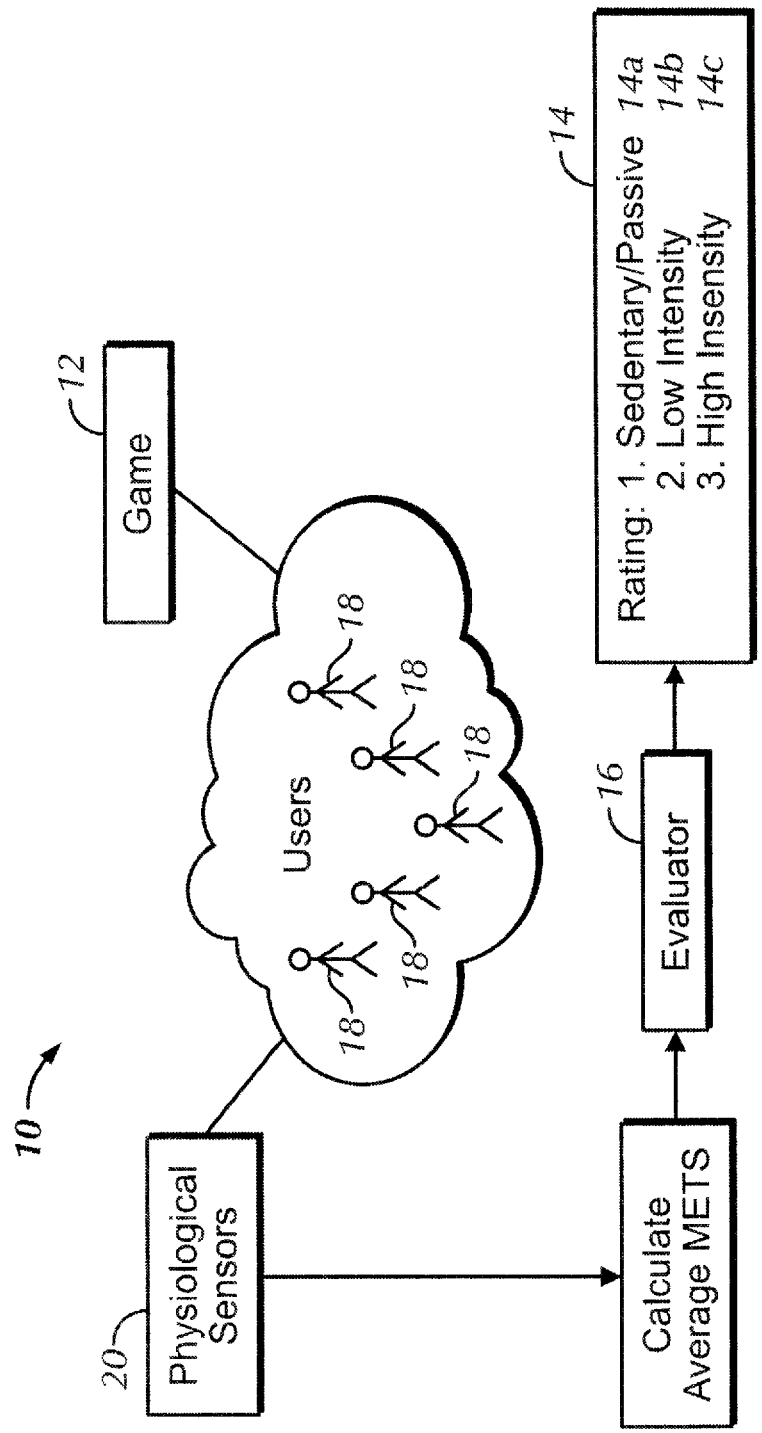
FIG. 3 is a diagram of a system for evaluating video games in accordance with the preferred embodiment of the present invention.

Once the testing under the preferred intensity rating system 10 is completed, the evaluator 16 is able to assign a rank or intensity rating 14 to the game 12. The intensity rating 14 preferably provides consumers with information about the physicality or level of activity and intensity required for the particular game 12. The intensity rating 14 may be communicated utilizing the above-described phrases including sedentary/passive 14a, low intensity 14b, moderate intensity 14c and high intensity 14d. Alternatively, the intensity rating 14 may be communicated utilizing symbols 15 to generally convey the intensity rating 14 to the users. Specifically referring to FIG. 2, the symbols 15 utilized to indicate the four-tier intensity rating system 14 permit a relatively simple format for conveying the ratings to the consumers in a universal manner, via rating symbols 15a, 15b, 15c, 15d. The rating symbols 15a, 15b, 15c, 15d are preferably able to convey the intensity rating 14 without requiring translation into various languages. Accordingly, the symbols 15 for the intensity rating system 14 are able to universally convey the ratings to consumers. The particular rating symbols 15a, 15b, 15c, 15d utilized to indicate the intensity rating 14 shown in FIG. 2 are not meant to be limiting and may be comprised of nearly any symbol that is able to convey the intensity of the game 12 to the consumer in a relatively simple manner.

Figure 4:
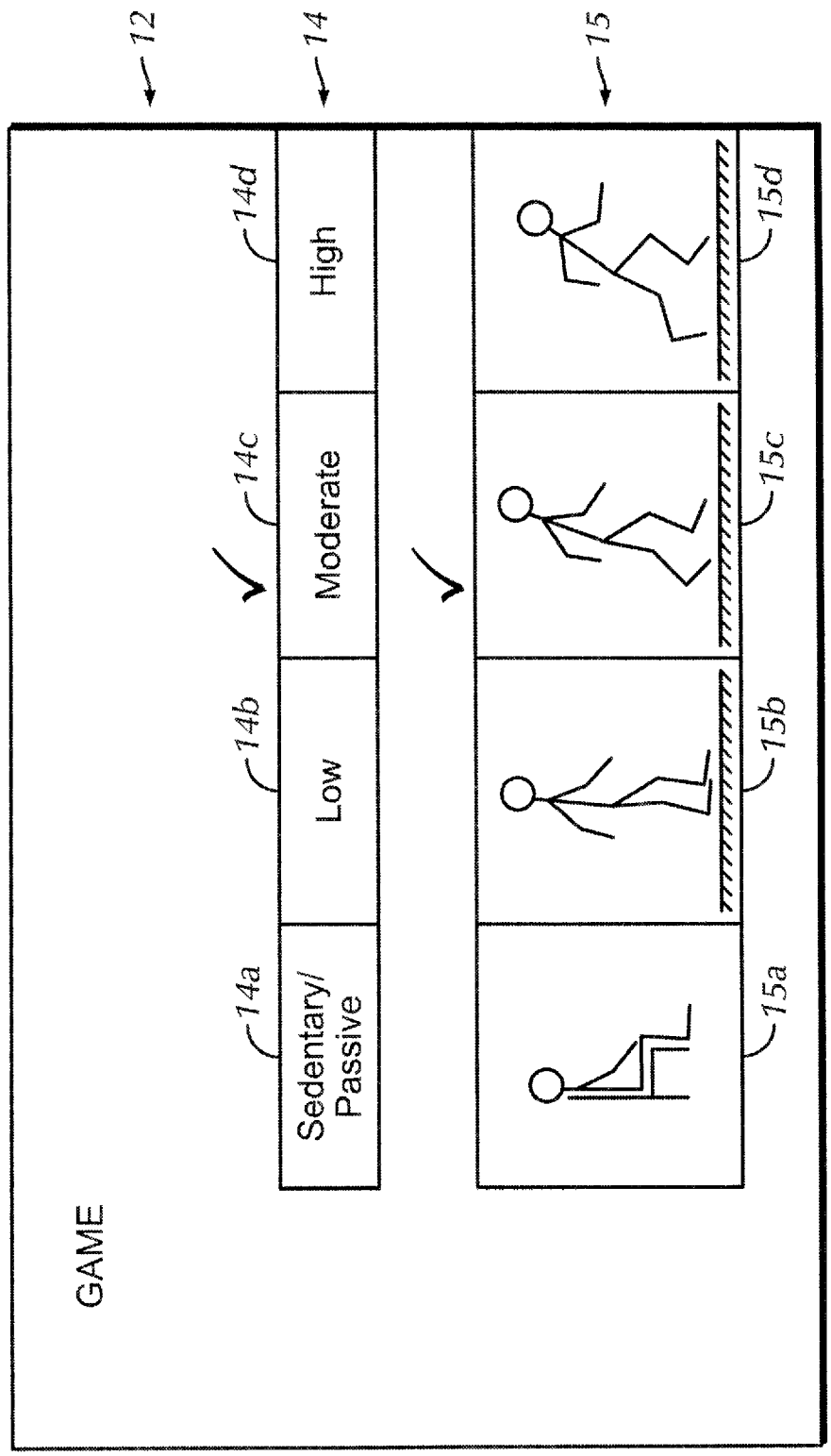
FIG. 4 is a front elevational view of a video game labeled with an intensity rating of the preferred embodiment of the present invention.

The preferred rating symbols 15a, 15b, 15c, 15d to characterize the intensity rating 14 include the seated individual symbol 15a to indicate the sedentary/passive rating 14a, the walking individual symbol 15b to communicate the low intensity rating 14b, the brisk walking symbol 15c to indicate the moderate intensity rating 14c and the running/jogging or swimming symbols 15d to indicate the high intensity rating 14d. The preferred rating symbols 15a, 15b, 15c, 15d shown in FIGS. 2 and 4 are not limiting and may be comprised of nearly any symbol or indication selected by the evaluator 16 or any governing body to communicate to the consumer the expected amount of energy expended for the selected game 12. The symbols 15 may take on any form that is able to convey such information to the consumer. The rating symbols 15a, 15b, 15c, 15d are generally selected to indicate the amount of activity expected while playing the game 12 that a consumer may expect in the activity.

Referring to FIGS. 1-4, the intensity rating 14 may include only three (3) categories including the sedentary/passive rating 14a, the low intensity rating 14b and the high intensity rating 14d. In this alternative configuration, the sedentary/passive rating 14a preferably indicates the game 12 results in activity of approximately one MET or RMR, the low intensity rating 14b means average game play results in expenditure in the range of one to five and nine tenths METs (1-5.9) and the high intensity rating indicates average game play results in six or more METs average energy expenditure. The three-category intensity rating 14 is a further simplification for communication with the consumer. The three-category intensity rating 14 also makes quantification into the intensity rating 14 slightly easier for the evaluator 16. Screening and testing of selected games 12 is preferably not different than that of the four-category intensity rating 14 as energy expenditure is still utilized for the rankings. The intensity rating 14 may alternatively be broken into less than three or more than four categories, as long as the intensity rating 14 provides a meaningful, relatively easy to understand indication to a consumer of the expected amount of physical exertion expected during game play.

Referring to FIG. 4, the intensity rating 14 may be communicated in various manners to the consumer. For example, the intensity rating 14 may be printed in word or symbol format on the labeling or box of the game 12 or may be displayed at the point of sale of the game 12, either in store or onscreen. Each of the various levels of ratings 14a, 14b, 14c, 14d may be displayed with a mark indicating the appropriate individual rating 14a, 14b, 14c, 14d or identifying using the appropriate rating symbol 15, A, 15b, 15c, 15d. Further, reports related to the testing conducted on the specific game 12 by the evaluator 16 may be provided for consumers desiring further details regarding the intensity rating 14. Unique aspects or characteristics, such as handicapped game indications, which were described above, may be displayed on or with the game 12. The intensity rating 14 or symbol 15 may also be indicated or associated with a bar code or quick response ("QR") code that, when viewed with a reader such as a smart phone, would prompt the reader to provide additional information to the consumer. For example, the reader may take the consumer to or display to the consumer a website with additional information related to the intensity rating 14 or symbol 15. The additional information could include more detailed information about the physicality of game play of the game 12, comparative analysis to other similar games 12, supporting information related to the intensity rating 14, supporting information related to the symbols 15, videos of users 18 playing the game 12, promotional information related to similar games 12 or nearly any other information that may be useful for the consumer in making a purchasing decision. The additional information may also include similarly situated games 12 that the consumer may be interested in investigating. Such information of related games 12 may be utilized by designers, manufacturers or developers to market or promote games 12 that would be of interest or benefit to the particular consumer.

Additional sub-categories or information may also be provided with the intensity rating 14 or symbols 15 to provide additional description for the consumer. For example, qualifiers may be utilized in the intensity rating 14 such as a continuous designation indicating movement is continuous throughout the game 12, an episodic indicator showing that movement occurs at regular intervals in the game 12, a sporadic indicator describing that movement occurs sporadically during the game 12, handicapped indicators showing that the game 12 is appropriate for handicapped users or numerous other indicators that provide specialized information about the game 12. Additional descriptors may also include genre descriptors such as sports, simulation, dance, fighting, action, adventure, strategy, role playing, racing, trivia or like indicators, mode indicators such as open world which impacts the frequency of physicality and consistency of active game play, closed world, which indicates physicality at certain times during game play, likely making active game play more consistent, in-room play, indicating games designed to be played primarily in a single room near a television, out-of-room play indicating the game 12 is primarily played by a portable, virtual reality or augmented reality device and designed to have the play move across distances and other like descriptors. Further descriptors that may be utilized in the intensity rating 14 to provide further information to the consumer may include categories such as rhythm, marital arts, boxing, fighting, sports fitness simulation, jumping, punching, kicking, augmented reality, motion, swinging, variable intensity, positive reward and related descriptors.

Extended descriptions may also be utilized for the intensity rating 14 of the preferred intensity rating system 10. The extended descriptions preferably appear on the packaging of the game 12 or on a website and provide extended descriptions of the physicality of game play. The extended descriptions preferably include a summary of the content of the game, a description of movements made during the majority of the game play, how the movements apply to the context of the game 12, extended explanations of the game's subtitle qualifiers (jumping, rhythm, etc.), explanations of the impact of game settings on the intensity of game play, special notes about the game 12, or other like descriptions. Explanations regarding the various settings of the game 12 may be described, for example, any game settings that may alter the particular game 12 between the levels in the intensity rating 14, such as from a sedentary/passive rating 14a to a high intensity rating 14d are preferably provided.

Communication of the intensity rating 14 is not limited to being printed or posted on the game 12 itself or its packaging and may be communicated through a website, either public or subscription only, communicated through a newsletter or communicated in nearly any manner that is able to identify the relevant intensity rating 14 to the appropriate purchaser. The intensity rating system 10 of the preferred embodiment also contemplates follow-ups to the games 12 that are already rated to confirm that the particular intensity rating 14 that was assigned to the game 12 is not erroneous or should change based changed circumstances. For example, games 12 are often changed and updated following initial release or may simply be updated by providing patches to the game 12 weeks or months after initial release. The evaluator 16 preferably provides surveillance or follow-up on the games 12 following upgrades or patches to determine if modifications to the intensity rating 14 are appropriate. If the evaluator 16 determines that updates to the intensity rating 14 are necessary, the game 12 may be retested or re-ranked based on changed circumstances.

In use, the intensity rating system 10 of the present application rates the intensity of game play of the video game 12 based on energy expenditure of the user 18 playing the game 12. The video game 12 to be evaluated is initially selected or provided. The preferred intensity rating system 10 may be utilized such that only video games 12 including motion/location technology, accelerometers, gyroscopes and/or augmented reality technology are selected for categorization with an intensity rating 14. Alternatively, the games 12 selected may be limited to exercise-based video games 12 in a preferred employment of the intensity rating system 10. Once the game 12 is selected, a determination is made whether the game 12 requires the user 18 to expend energy in excess of an approximate RMR. If the game 12 is not expected to require energy to be extended in excess of RMR, the game 12 is categorized with the sedentary/passive rating 14a and may be labeled with the sedentary/passive symbol 15a. Otherwise, the game 12 is preferably tested by having a plurality of the users or testers 18 play the video game 12 for at least one hour intervals. During the one hour interval of game play, energy expenditure of the plurality of users 18 is measured with the physiological sensors 20. The interval or predetermined interval of game play for testing is not limited to one hour intervals and may be between one and six hours (1-6 hrs), less than one hour (<1 hr), more than six hours (>6 hrs) or nearly any interval that provides meaningful energy expenditure during game play. The testing interval is preferably determined by the evaluator 16 such that an informed intensity rating 14 may be provided to the game 12 based on the characteristics of the game 12 that is being evaluated. Energy expenditure of each of the plurality of users or testers 18 is calculated for the period during game play. An average energy expenditure is subsequently calculated for the plurality of users or testers 18. The video game 12 is preferably categorized in the intensity rating 14 based on the calculated average energy expenditure. In the preferred embodiment, the game 12 is preferably categorized into one of the four categories of the intensity rating 14, including the sedentary/passive rating 14a, low intensity rating 14b, moderate intensity rating 14c or high intensity rating 14d.

In the preferred embodiment of the intensity rating system 10, the average energy extended by the plurality of users or testers 18 is converted into the MET for ranking in the intensity rating 14. Specifically, in the preferred embodiment, average energy expenditure greater than one to approximately three (1-3) METs is rated as low intensity 14b, average energy expenditures greater than three to approximately six (>3-6) METs is rated as moderate intensity 14c and average energy expenditures greater than approximately six (>6) METs is rated as high intensity 14d. The testing and intensity ratings 14 are preferably memorialized in a report of the specific video game 12 for reference by the evaluator 16, to provide information to the consumer or for reference when conducting follow-up on the particular game 12.

The testing and evaluation of a plurality of video games 12 may be conducted utilizing the methodology of the preferred intensity rating system 10 and a database of intensity ratings 14 for the plurality of video games 12 may be created. The video games 12 that are evaluated may be grouped into sub-categories, globally grouped together or alternatively arranged for communication to consumers. Subscription consumers may also be solicited or gathered who are provided access to this database by an intensity rating service. The intensity rating service would provide the updated database information to the subscription consumers for the consumer's purposes, such as for making informed video game 12 purchasing decisions.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the appended claims.

I claim:

1. A method of rating the intensity of game play of video games, including a first video game and a second video game, based on energy expenditure of a user playing the video games, the method comprising the steps of:
   a) selecting the first and second video games to rate;
   b) determining whether the first video game and the second video game require the user to expend energy in excess of an approximate resting energy rate;
   c) testing the first video game and the second video game by having a plurality of users play the first and second video games for at least one hour intervals;
   d) measuring energy expenditure of the plurality of users in step (c) with physiological sensors;
   e) calculating the energy expenditure of each of the plurality of users during a predetermined time period of game play;
   f) calculating an average energy expenditure of the plurality of users for each of the first and second video games; and
   g) categorizing the first and second video games based on the average energy expenditure as one of at least low intensity, moderate intensity, and high intensity for comparing the intensity of game play of the first video game to the second video game.

2. The method of claim 1, wherein the first and second video games are categorized as generally passive and sedentary following step (b) when expected energy expended during game play is approximately the resting energy rate of the user.

3. The method of claim 1 comprising the further step of:
   h) converting the average energy expended into a metabolic equivalent of task (MET), wherein the first and second video games are categorized as low intensity if the average energy expenditure is greater than one (1) to approximately three (3) METs, moderate intensity if the average energy expenditure is greater than three (3) to approximately six (6) METs and high intensity if the average energy expenditure is greater than six (6) METs.

4. The method of claim 1 wherein the testing interval of step (c) is between one (1) hour and six (6) hours.

5. The method of claim 1 comprising the further step of:
   h) preparing a report of the categorization of the first and second video games.

6. The method of claim 1 wherein the physiological sensors of step (d) include at least one of a thermometer, a heart rate sensor, a carbon dioxide sensor, an oxygen sensor, a heart rate sensor, an accelerometer, a breathing rate sensor, a movement sensor, a global positioning system sensor, a respiration sensor, a skin conductance sensor, an electromyogram, an optical sensor, and a scale.

7. The method of claim 6 wherein the energy expenditure of step (e) is calculated utilizing data from the physiological sensors and the predetermined time period during which the user played the first and second video games.

8. The method of claim 1 comprising the further step of:
   h) labeling the packaging of the first and second video games with at least one of the low intensity, moderate intensity and high intensity.

9. The method of claim 1 comprising the further step of:
   h) repeating steps (a)-(g) with a plurality of additional video games; and
   i) providing a database of the plurality of additional video games, the first video game and the second video game grouped into their appropriate categories determined in step (g) to subscribers of an intensity rating service.

10. The method of claim 1 wherein each of the first and second video games selected in step (a) include at least one of motion/location technology, accelerometers, gyroscopes, and augmented reality technology.

11. The method of claim 1 wherein each of the first and second video games selected in step (a) is an exercise-based video game.

12. A method of rating the intensity of game play of a plurality of video games including a first video game and a second video game that require a user to expend energy in excess of an approximate resting energy rate, the method comprising the steps of:
   a) testing the first video game and the second video game by having a plurality of users play the first and second video games for at least one hour intervals;
   b) measuring energy expenditure of the plurality of users in step (a) with physiological sensors;
   c) calculating the energy expenditure of each of the plurality of users during a predetermined time period of game play;
   d) calculating an average energy expenditure of the plurality of users for each of the first and second video games; and
   e) categorizing the first and second video games based on the average energy expenditure as one of at least low intensity, moderate intensity, and high intensity for comparing the intensity of game play of the first video game to the second video game.

13. The method of claim 12 comprising the further step of:
   f) converting the average energy expended into a metabolic equivalent of task (MET), wherein the first and second video games are categorized as low intensity if the average energy expenditure is greater than one (1) to approximately three (3) METs, moderate intensity if the average energy expenditure is greater than three (3) to approximately six (6) METs and high intensity if the average energy expenditure is greater than six (6) METs.

14. The method of claim 12 comprising the further step of:
   f) repeating steps (a)-(g) with a plurality of additional video games of the plurality of video games; and
   i) providing a database of the plurality of additional video games, the first video game and the second video game grouped into their appropriate categories determined in step (e) to subscribers of an intensity rating service.

15. The method of claim 12 wherein the physiological sensors of step (b) include at least one of a thermometer, a heart rate sensor, a carbon dioxide sensor, an oxygen sensor, a heart rate sensor, an accelerometer, a breathing rate sensor, a movement sensor, a global positioning system sensor, a respiration sensor, a skin conductance sensor, an electromyogram, an optical sensor, and a scale.

16. The method of claim 15 wherein the energy expenditure of step (c) is calculated utilizing data from the physiological sensors and the predetermined time period during which the user played the first and second video games.

17. The method of claim 12 comprising the further step of:
  f) labeling the packaging of the first and second video games with at least one of the low intensity, moderate intensity and high intensity based on the categorizing in step (e).

18. The method of claim 12 wherein each of the first and second video games include at least one of motion/location technology, accelerometers, gyroscopes, and augmented reality technology.

19. The method of claim 12 wherein the first and second video games are exercise-based video games.

* * * * *